(12) United States Patent
Sefcik et al.

(10) Patent No.: US 10,436,303 B2
(45) Date of Patent: Oct. 8, 2019

(54) SCISSOR GEAR ASSEMBLY WITH INTEGRAL ISOLATION MECHANISM

(71) Applicant: Linamar Corporation, Guelph (CA)

(72) Inventors: Michael C Sefcik, Linden, MI (US); Michael Biga, II, Milford, MI (US)

(73) Assignee: Linamar Corporation, Guelph, Ontario ( * ) Notice: Subject to any disclaimer, the term of this patent is extended or adjusted under 35 U.S.C. 154(b) by 0 days.

(21) Appl. No.: 15/534,250

(22) PCT Filed: Dec. 11, 2015

(86) PCT No.: PCT/IB2015/002458
§ 371 (c)(1),
(2) Date: Jun. 8, 2017

(87) PCT Pub. No.: WO2016/092370
PCT Pub. Date: Jun. 16, 2016

(65) Prior Publication Data
US 2017/0363197 A1    Dec. 21, 2017

Related U.S. Application Data

(60) Provisional application No. 62/090,641, filed on Dec. 11, 2014.

(51) Int. Cl.
*F16H 55/18* (2006.01)
*F16H 57/12* (2006.01)
*F16H 55/14* (2006.01)

(52) U.S. Cl.
CPC .............. *F16H 55/18* (2013.01); *F16H 55/14* (2013.01); *F16H 57/12* (2013.01)

(58) Field of Classification Search
CPC .......... F16H 55/18; F16H 55/14; F16H 57/12; F16H 57/0006
See application file for complete search history.

(56) References Cited

U.S. PATENT DOCUMENTS

| 6,021,686 | A | 2/2000 | Mizoguchi |
| 6,161,512 | A * | 12/2000 | Beels Van Heemstede ................ F16F 15/1232 123/192.1 |
| 6,661,986 | B2 | 12/2003 | Kitayama |
| 7,980,369 | B2 | 7/2011 | Kneidel et al. |
| 2010/0139431 | A1 | 6/2010 | Park |

(Continued)

FOREIGN PATENT DOCUMENTS

WO    2014101996    7/2014

*Primary Examiner* — Jake Cook
(74) *Attorney, Agent, or Firm* — Miller Canfield

(57) ABSTRACT

A drive gear assembly rotatably drives a driven gear of an engine component. The drive gear assembly comprises a drive shaft extending longitudinally along an axis. A main drive gear is operatively coupled to the drive shaft and a scissor gear is aligned coaxially with the main drive gear. A scissor spring is disposed and operatively coupled between the main drive gear and the scissor gear and biased therebetween wherein the main drive gear and the scissor gear rotate about the axis relative to each other. An isolation mechanism is operatively coupled between the main drive gear and the drive shaft for absorbing impulse loads generated by the driven gear when engaged with the main drive gear.

5 Claims, 5 Drawing Sheets

(56) References Cited

U.S. PATENT DOCUMENTS

| | | | |
|---|---|---|---|
| 2011/0203398 A1* | 8/2011 | Meier | F16D 1/104 |
| | | | 74/448 |
| 2013/0145878 A1 | 6/2013 | Kim et al. | |
| 2013/0213168 A1* | 8/2013 | Buchleitner | F16H 55/18 |
| | | | 74/445 |
| 2013/0228029 A1 | 9/2013 | Murphy et al. | |

* cited by examiner

SCISSOR GEAR ASSEMBLY WITH INTEGRAL ISOLATION MECHANISM

CROSS-REFERENCE TO RELATED APPLICATION

This application claims priority to and all the benefits of U.S. Provisional Application No. 62/090,641 filed on Dec. 11, 2014, and entitled "Scissor Gear Mechanism with Integral Isolation Feature".

BACKGROUND OF THE INVENTION

1. Field of the Invention

The invention relates to a scissor gear assembly having an isolation mechanism loaded between a main drive gear and a driven gear to prevent backlash and absorb impulse loads between the drive and driven gears.

2. Description of Related Art

A gear assembly is a device that transmits rotational torque using multiple toothed engaged gears. However, backlash between the gears creates undesirable vibration and rattling in the gear assembly.

Scissor gears are known for preventing vibration and noise due to backlash between gears, in for example gears in an engine for transmitting power. A scissor gear typically includes a main gear and a secondary gear coupled to the main gear by a scissor spring to allow rotation therebetween. When the scissor gear, also often the drive gear, is engaged with a driven gear, the teeth on the scissor gear align and mesh with the teeth on the driven gear to remove backlash and reduce vibration and noise therebetween.

It remains desirable to improve scissor gears to further absorb impulse loads generated between the scissor gear, or drive gear, and the driven gear.

SUMMARY OF THE INVENTION

A drive gear assembly is provided for rotatably driving a driven gear. The drive gear assembly comprises a drive shaft extending longitudinally along an axis. A main drive gear is operatively coupled to the drive shaft and a scissor gear is aligned coaxially with the main drive gear. A scissor spring is disposed and operatively coupled between the main drive gear and the scissor gear and biased therebetween wherein the main drive gear and the scissor gear rotate about the axis relative to each other. An isolation mechanism is operatively coupled between the main drive gear and the drive shaft for absorbing impulse loads generated by the driven gear when engaged with the main drive gear.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
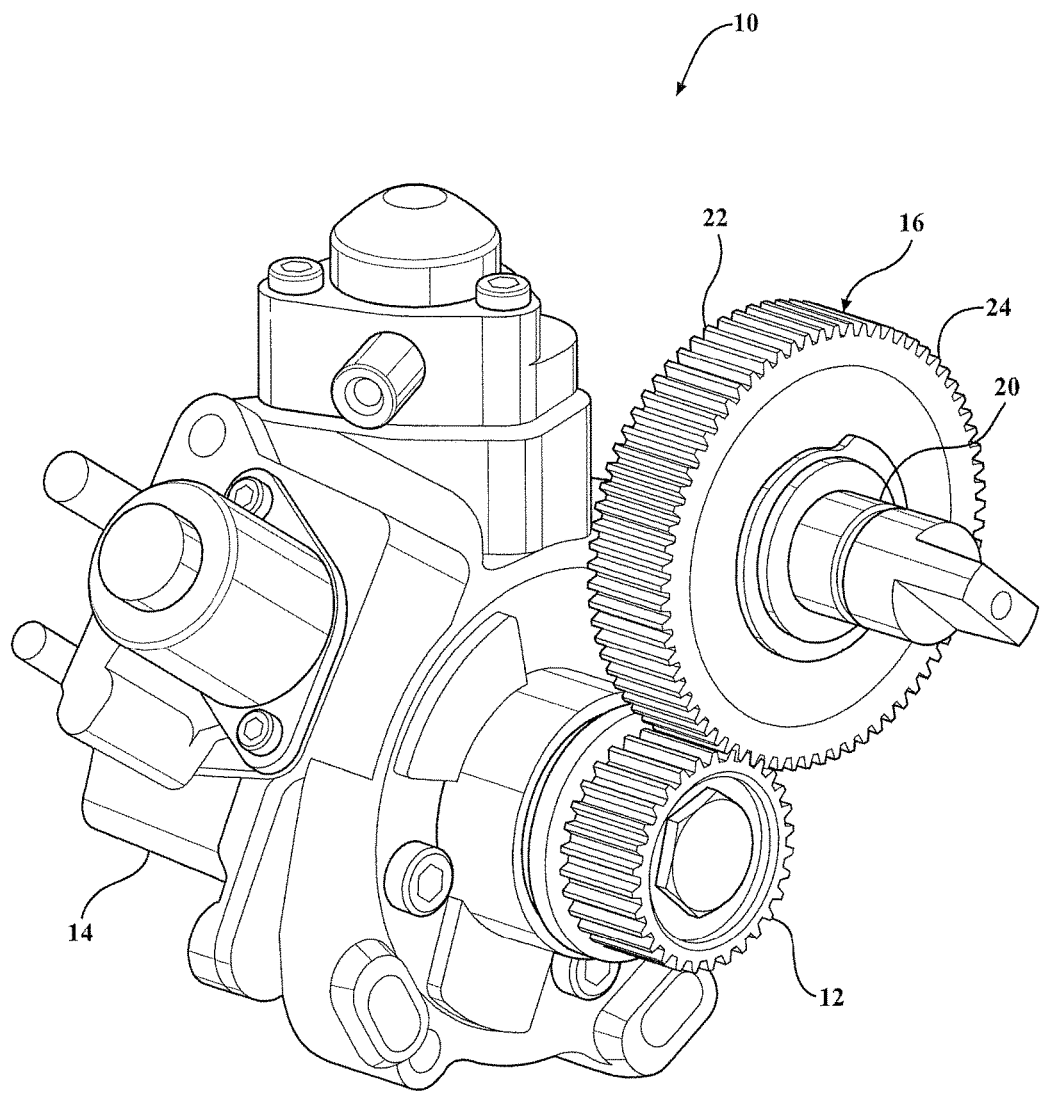
FIG. 1 is a plan view of the main drive gear and scissor mechanism in meshed engagement with a pump drive gear of an engine.
Figure 2:
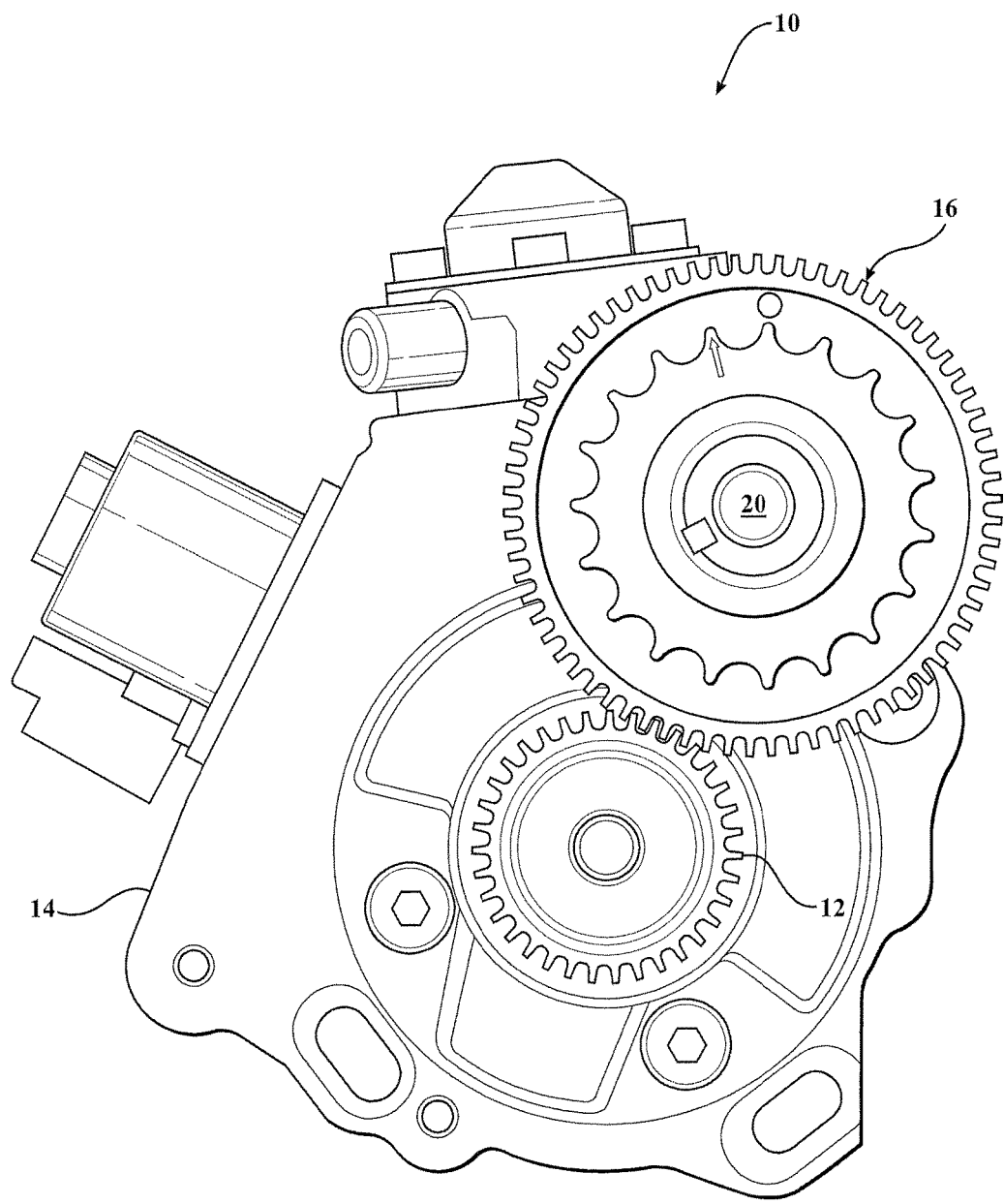
FIG. 2 is a perspective view of the main drive gear, scissor mechanism and pump drive gear for actuating a fuel injection pump of an engine.
Figure 3:
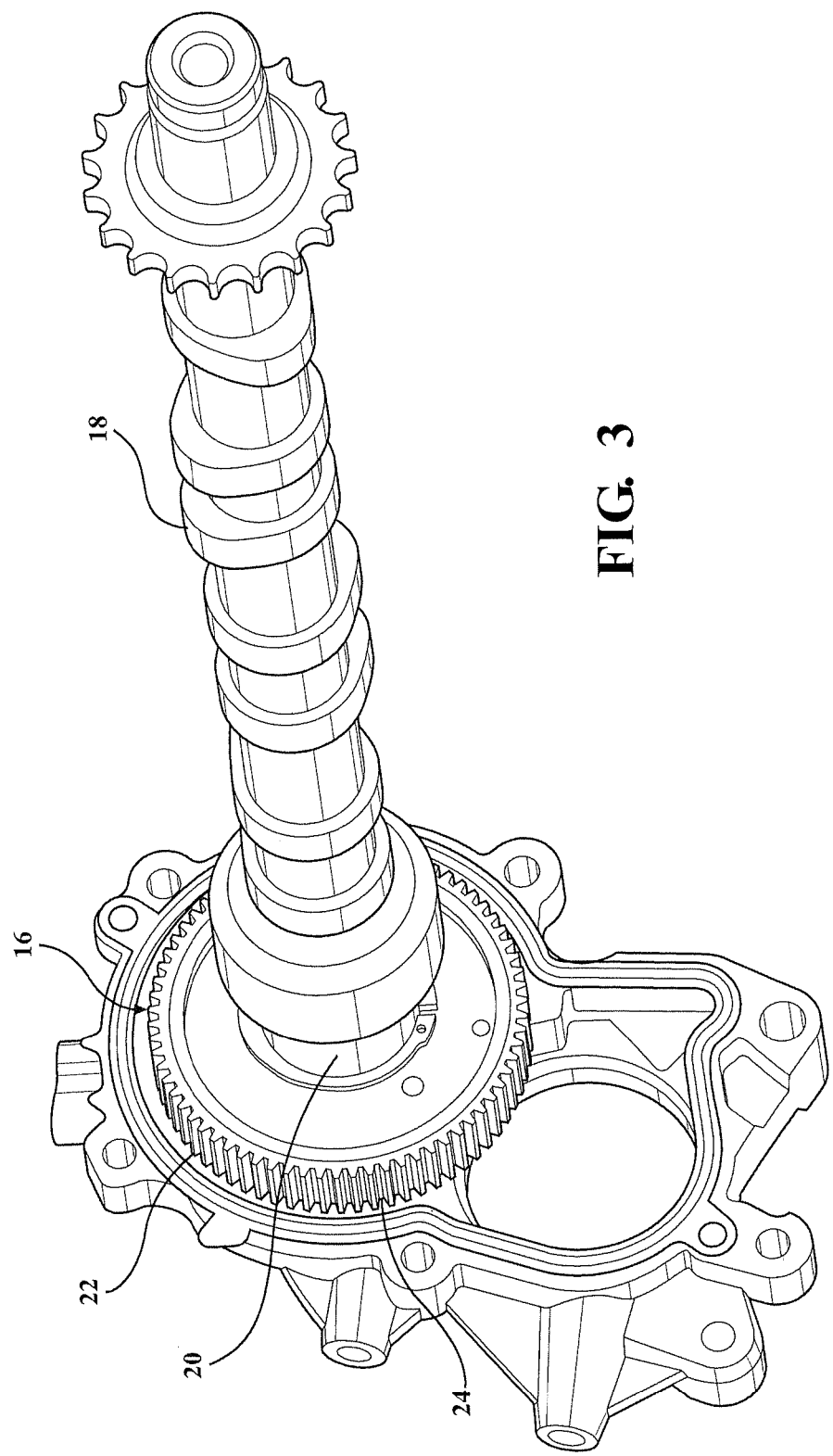
FIG. 3 is a perspective view of a cam shaft coupled to the main drive gear and scissor mechanism by an isolation mechanism.

Referring to the Figures, an engine for an automotive vehicle is generally shown at 10 in FIGS. 1 and 2 having a pump gear, or driven gear, 12 for actuating a fuel injection pump 14 or other engine accessory component. A drive gear assembly, or scissor gear assembly, 16 is in meshed engagement with the driven gear 12 to rotatably drive the driven gear 12 and actuate the fuel injection pump 14 or other component. The drive gear assembly 16 is rotatably driven by a camshaft, or drive shaft, 18 of the engine 10 as shown in FIG. 3.

Figure 4:
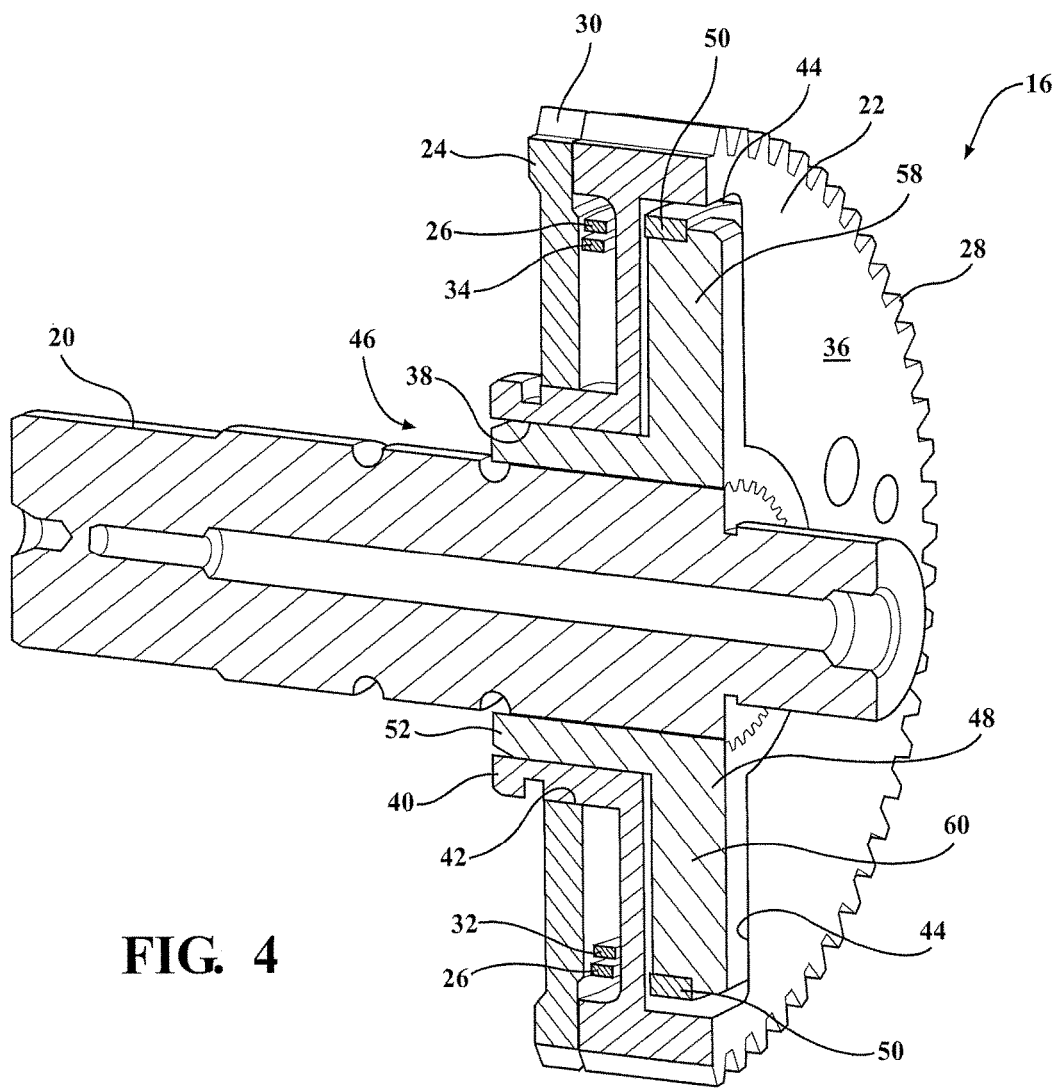
FIG. 4 is a cross-sectional perspective view of the drive gear assembly and isolation mechanism.
Figure 5:
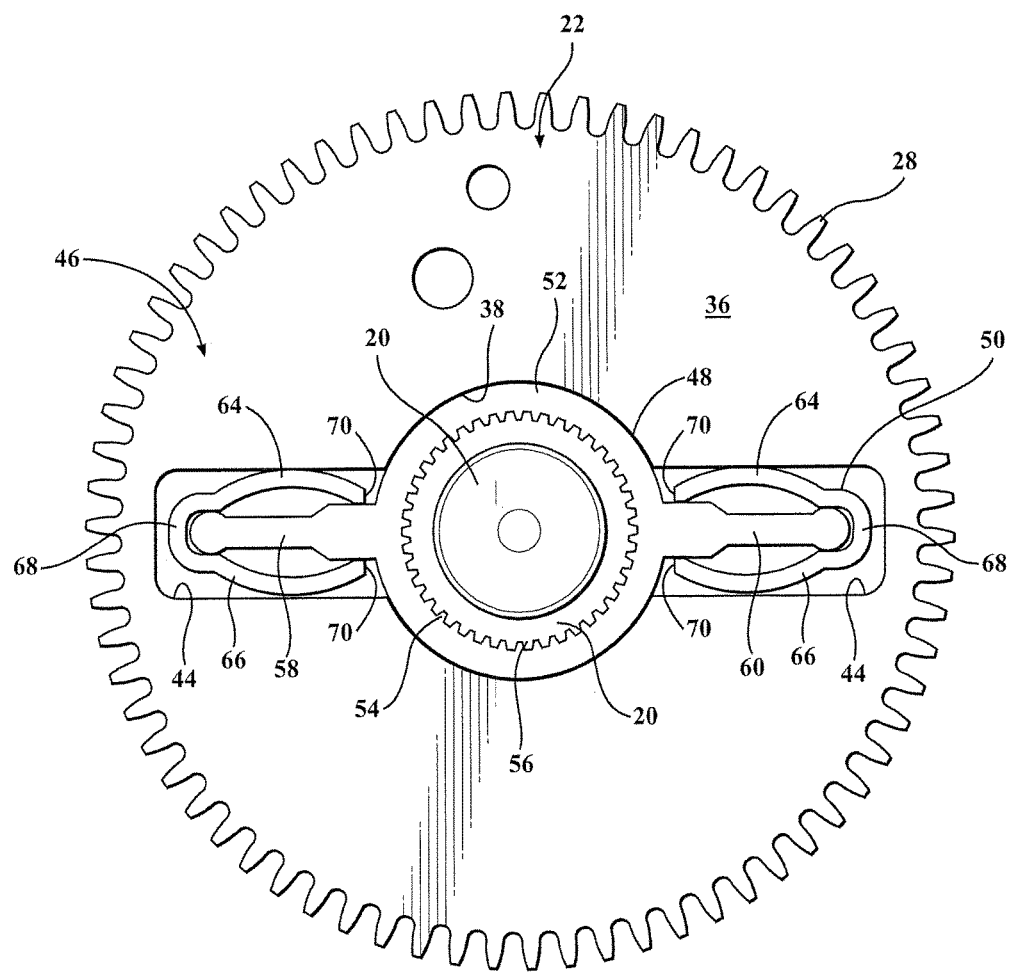
FIG. 5 is a cross-sectional plan view of the main drive gear including a damper drive bar and isolation springs coupled between a camshaft and the main drive gear.

Referring to FIGS. 4 and 5, the camshaft 18 includes a camshaft extension 20 fixedly secured thereto. The drive gear assembly 16 is fixedly secured to the camshaft extension 20 for rotation with the camshaft 18. The drive gear assembly 16 comprises a main drive gear 22 and a scissor gear, or bias gear, 24 co-axially aligned with and operatively coupled to the main drive gear 22. A scissor spring 26 is seated and pinned between the main drive gear 22 and the scissor gear 24 to bias and load the scissor gear 24 relative to the main drive gear 22 when the respective radially projecting gear teeth are axially aligned as is commonly known in the art. More specifically, the main drive gear 22 includes a plurality of radially projecting gear teeth 28 and the scissor gear 24 includes a corresponding plurality of radially projection gear teeth 30. A first end of the scissor spring 26 is seated against a pin 32 projecting from the main drive gear 22 and a second opposite end of the scissor spring 26 is seated against a pin 34 projecting from the scissor gear 24 to bias and load the scissor gear 24 such that the gear teeth 30 axially align along the axis x with the gear teeth 28 of the main drive gear 22. The radial gear teeth 28 of the main drive gear 22 and radial gear teeth 30 of the scissor gear 24 are both in meshed engagement with radial gear teeth 36 projecting from lire driven gear 12, as shown in FIGS. 1 and 2, to prevent backlash between the drive gear assembly 16 and the driven gear 12. The main drive gear 22 further includes a disc shaped base plate 36 having a center bore 38 for receiving the camshaft extension 20 therethrough and a center hub 40 encircling the center bore 38 and projecting axially from the base plate 36. The scissor gear 24 includes a center bore 42 for receiving the center hub 40 of the main drive gear 22 and allowing relative rotation therebetween. Still further, the main drive gear 22 include a pair of recessed cavities 44 formed in the base plate 36 each intersecting the center bore 38 and projecting radially from opposite sides of the bore 38 to respective terminal distal ends.

Still referring to FIGS. 4 and 5, the drive gear assembly 16 is operatively coupled to the camshaft extension 20, and thus the camshaft 18, by an isolation mechanism 46 for absorbing impact loads generated by the camshaft 18 while still transferring rotation of the drive gear 22 to the driven gear 12. The isolation mechanism 46 includes a damper drive bar 48 and an isolation spring 50. The damper drive bar 48 is fixedly connected to the camshaft extension 20 by a zero lash spline whereby the damper drive bar 48 rotates with the camshaft extension 20 driven by the camshaft 18. More specifically, the damper drive bar 48 includes a cylindrical center hub 52 having an inner surface defined by a plurality of axial splines 54 and an opposite outer surface sized to be received in the center bore 38 of the main drive gear 22. The distal end of the camshaft extension 20 also includes a plurality of axial splines 56 for mating engagement with the splines 54 on the drive bar 48 to fixedly secure the drive bar 48 to the camshaft extension 20. It should be appreciated that the drive bar 48 may be fixedly secure to the camshaft extension 20 by other means, such as press-fit, fasteners, etc. without varying the scope of the invention. The damper drive bar 48 further includes a pair of laterally extending arms 58, 60 projecting from opposing sides of the center hub 52 to distal ends and seated in the corresponding cavities or pockets 44 formed in the drive gear 22 to rotatably couple the damper drive bar 48 to the drive gear 22. A generally U-shaped isolation spring 62 is seated between each of the arms 58, 60 on the damper drive bar 48 and the cavity 44 of the drive gear 22. More specifically, each isolation spring 62 is a c-clip type spring wrapped around the distal end of each of the arms 58, 60 and engaged between the arm 58, 60 and the respective opposing side walls forming the cavities 44 in the drive gear 22 thereby centering the arms 58, 60 within the cavities 44. The isolation spring 62 includes a pair of spaced apart bowed arms 64, 66 interconnected at a proximal end 68 and extending to free distal ends 70. The proximal end 68 is seated about the distal end of the drive bar and 58, 60 with each distal end 70 biased against the opposing sides of the drive bar arm 58, 60 adjacent the center hub 52. A bowed portion of the spring arms 64, 66 extending between the proximal end 68 and distal end 70 engages the sidewall forming the cavity 44 in the drive gear 22.

In operation, the drive gear assembly 16 drives the pump gear 12 to actuate or drive the fuel injection pump 14. The main drive gear 22 of the drive gear assembly 16 is rotatably driven by the camshaft 18 of the engine 10. However, the fuel injection pump 14 imparts an impulse load into the main drive gear 22 as it pushes fuel to the engine 10. The impulses create harmonic imbalance that can overpower the spring force in the scissor gear 24 and the drive gear assembly 16 tends to rattle. The damper drive bar 48 and isolation springs 50 break the direct connection between the camshaft 18 and the fuel injection pump 14 to absorb the impulse load. That is, by placing a high rate isolation spring 50 between main drive gear 22 and the driven gear 12, it allows both gears 22, 12 to behave naturally. Further, the spring rate, or deflection load per degree of rotation, is sufficiently high to provide positive drive of the gear assembly 16 and yet still flexible enough to absorb impulse loads from the camshaft 18. That is, the damper drive bar 48 and isolation springs 50 of the isolation mechanism 46 absorb the impulse loads from the camshaft 14 while still providing a rotatable connection between the camshaft 14 and drive gear 22 to drive the pump drive gear 12.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A drive gear assembly for rotatably driving a driven gear, said drive gear assembly comprising:
    a drive shaft extending longitudinally along an axis;
    a main drive gear operatively coupled to said drive shaft;
    a scissor gear aligned coaxially with said main drive gear;
    a scissor spring disposed and operatively coupled between said main drive gear and said scissor gear and biased therebetween wherein said main drive gear and said scissor gear rotate about said axis relative to each other; and
    an isolation mechanism operatively coupled between said main drive gear and said drive shaft for absorbing impulse loads generated by the driven gear when engaged with said main drive gear, said isolation mechanism including a drive bar fixedly secured to said drive shaft and an isolation spring operatively coupled between said drive bar and said main drive gear to rotatably couple said main drive gear to said drive shaft, wherein said main drive gear includes a base plate having at least one recessed cavity formed therein for receiving at least a portion of said drive bar and wherein said drive bar includes a hub fixedly secured to said drive shaft and at least one arm extending from said hub and received in said recessed cavity in said main drive gear.

2. The drive gear assembly as set forth in claim 1 wherein said isolation spring is seated between said at least one arm of said drive bar and said recessed cavity for rotatably coupling said main drive gear to said drive shaft.

3. The drive gear assembly as set forth in claim 2 wherein said drive bar includes a pair of arms extending radially from opposing sides of said hub and said main drive gear includes a pair of recessed cavities formed in said base plate for receiving a respective one of said arms therein.

4. The drive gear assembly as set forth in claim 3 wherein each of said isolation springs includes a pair of bowed spring arms interconnected at a proximal end and extending to a free distal end.

5. The drive gear assembly as set forth in claim 4 wherein each of said recessed cavities includes opposing side walls, said isolation spring coupled to each of said arms of said drive bar wherein one of said bowed spring arms is seated between each side of said arm of said drive bar and said respective side wall of said cavity for biasing and centering said arm of said drive bar within said recessed cavity and transferring rotation of said drive shaft to said main drive gear.

* * * * *

UNITED STATES PATENT AND TRADEMARK OFFICE
CERTIFICATE OF CORRECTION

Page 1 of 1

PATENT NO. : 10,436,303 B2
APPLICATION NO. : 15/534250
DATED : October 8, 2019
INVENTOR(S) : Michael C. Sefcik and Michael Biga It is certified that error appears in the above-identified patent and that said Letters Patent is hereby corrected as shown below:

On the Title Page

At Item (72) Inventors, Line 2, change from Michael Biga, II to Michael Biga

Signed and Sealed this
Third Day of December, 2019

Andrei Iancu
*Director of the United States Patent and Trademark Office*